US00RE47850E

(19) United States
(12) Reissued Patent
Phillips et al.

(10) Patent Number: US RE47,850 E
(45) Date of Reissued Patent: Feb. 11, 2020

(54) BALLISTIC SYSTEM AND METHOD FOR CUTTING A MULTI-LINK METAL CHAIN

(71) Applicant: Breaching Technologies, Inc., San Antonio, TX (US)

(72) Inventors: Darron Phillips, San Antonio, TX (US); Mark Ferris, San Antonio, TX (US); Bert Vermeulen, Cheyenne, WY (US)

(73) Assignee: Breaching Technologies, Inc., San Antonio, TX (US)

(21) Appl. No.: 16/013,458

(22) Filed: Jun. 20, 2018

Related U.S. Patent Documents

Reissue of:
(64) Patent No.: 9,372,048
Issued: Jun. 21, 2016
Appl. No.: 14/545,705
Filed: Jun. 8, 2015

(51) Int. Cl.
*F41C 27/20* (2006.01)
*F41C 27/16* (2006.01)
*B25D 9/11* (2006.01)

(52) U.S. Cl.
CPC ..... *F41C 27/20* (2013.01); *B25D 9/11* (2013.01)

(58) Field of Classification Search
CPC ..... F41C 27/16; F41C 27/20; B25D 9/11
See application file for complete search history.

(56) References Cited

U.S. PATENT DOCUMENTS 655,577 A * 8/1900 Pell et al. ..... F41C 27/18 140/139
1,181,223 A 5/1916 Holm
1,211,779 A * 1/1917 Steinmetz ..... F41C 27/20 30/1
2,446,994 A 8/1948 Barker
3,879,878 A * 4/1975 Musgrave ..... F41C 27/20 42/90
3,950,877 A * 4/1976 Musgrave ..... F41C 27/20 42/90
3,950,878 A 4/1976 Musgrave
4,115,944 A 9/1978 Musgrave
5,883,328 A * 3/1999 A'Costa ..... F41A 21/34 89/14.2
6,318,228 B1 11/2001 Thompson
7,854,085 B1 * 12/2010 Hodgkins ..... F41A 21/32 42/85
8,418,592 B1 4/2013 Gonstad et al.
(Continued)

OTHER PUBLICATIONS

Silvertip_3. ".308 vs 7.62 Nato—ar15.com." .308 vs 7.62 Nato—ar15.com. Mar. 9, 2012. Accessed Jun. 18, 2018. https://www.ar15.com/forums/ar-15/_308_vs_7_62_nato/121-566526/.
(Continued)

*Primary Examiner* — Jeffrey R Jastrzab
(74) *Attorney, Agent, or Firm* — Gunn Lee & Cave PC

(57) ABSTRACT

A system and method for ballistically cutting a multi-link metal chain comprises a chain alignment module that comprises three pins and attaches to the barrel of a firearm. A first pin and a second pin of the module fit on opposite sides of a target link of the chain. A third pin of the alignment module goes through a link adjacent to the target link of the chain. The three pins align the target link so that a bullet exiting the barrel of a firearm impacts a semicircular region of the target link to cause the target link to open.

28 Claims, 7 Drawing Sheets

(56) References Cited

U.S. PATENT DOCUMENTS

| | | | | |
|---|---|---|---|---|
| D682,972 | S * | 5/2013 | Kasanjian-King | D22/108 |
| 8,490,534 | B1 * | 7/2013 | Moore | F41A 21/34 181/223 |
| 8,893,421 | B2 * | 11/2014 | Degidio | F41A 21/40 42/79 |

OTHER PUBLICATIONS

Maleante. "The Definitive Answer to Can I Shoot .223 in My 5.56?—ar15.com." The Definitive Answer to Can I Shoot .223 in My 5.56?—ar15.com. Apr. 13, 2012. Accessed Jun. 18, 2018. https://www.ar15.com/forums/ar-15/The_definitive_answer_to_can_I_shoot 223_in_my_5_56_/118-570475/.

Silvertip_3. ".308 vs 7.62 Nato—ar15.com." .308 vs 7.62 Nato—ar15.com. Mar. 9, 2012. Accessed Oct. 16, 2015. http://www.ar15.com/forums/t_3_121/566526_308_vs_7_62_nato.html.*

Maleante. "The Definitive Answer to Can I Shoot .223 in My 5.56?—ar15.com." The Definitive Answer to Can I Shoot .223 in My 5.56?—ar15.com. Apr. 13, 2012. Accessed Oct. 16, 2015. http://www.ar15.com/forums/t_3_118/570475_The_definitive_answer_to_can_1_shoot_223_in_my_5_56_html.*

* cited by examiner

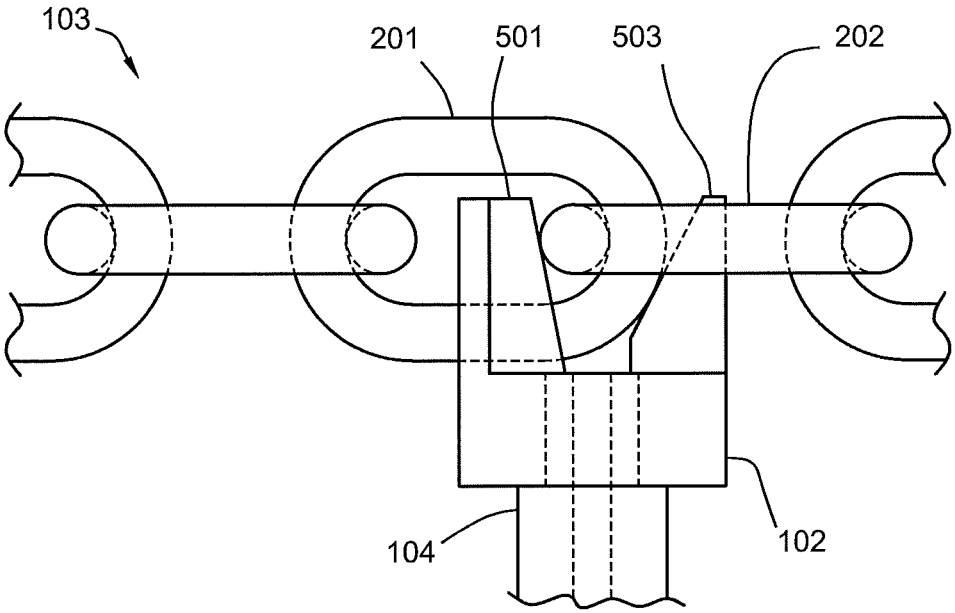
Fig.5
(AMENDED)
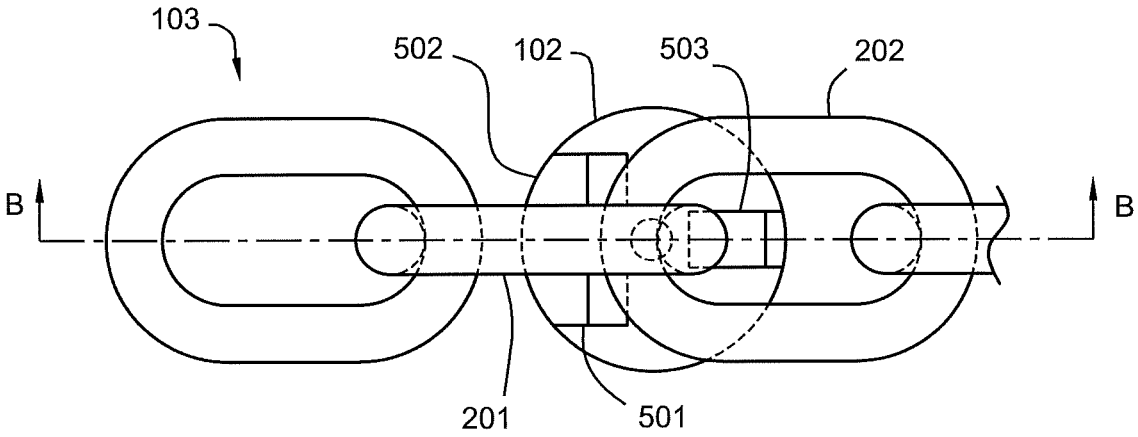
Fig.6
(AMENDED)

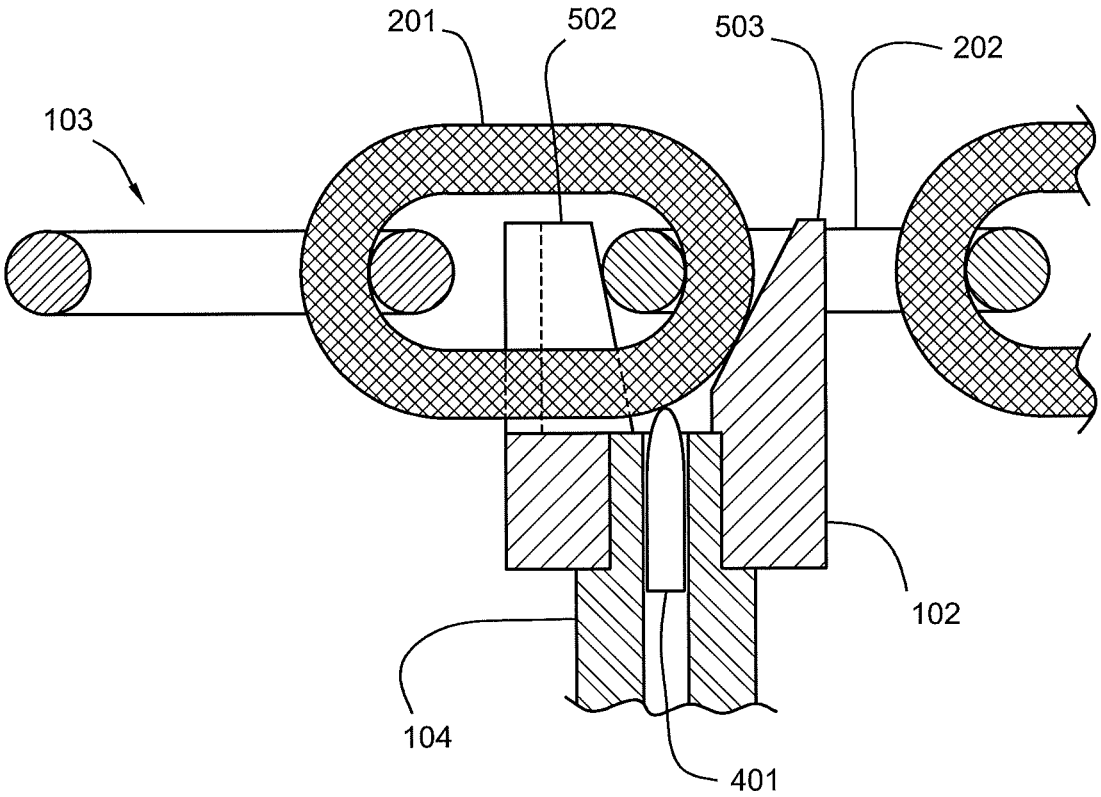
Fig.7
(AMENDED)

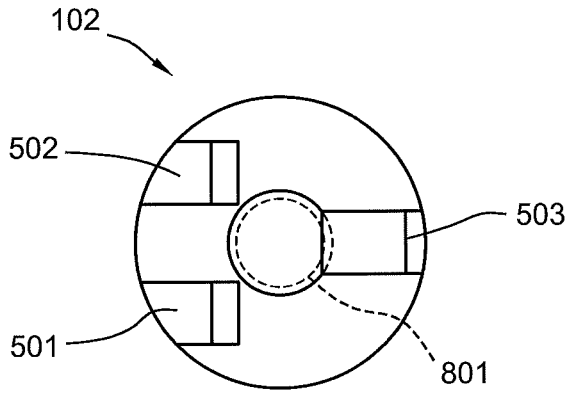
Fig.8A
(AMENDED)
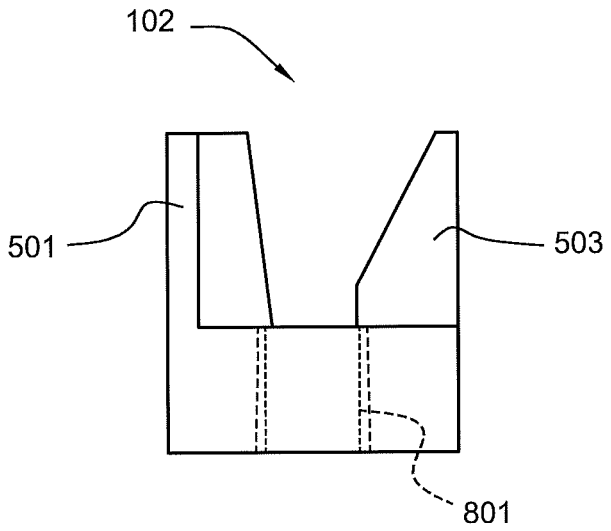
Fig.8B
(AMENDED)
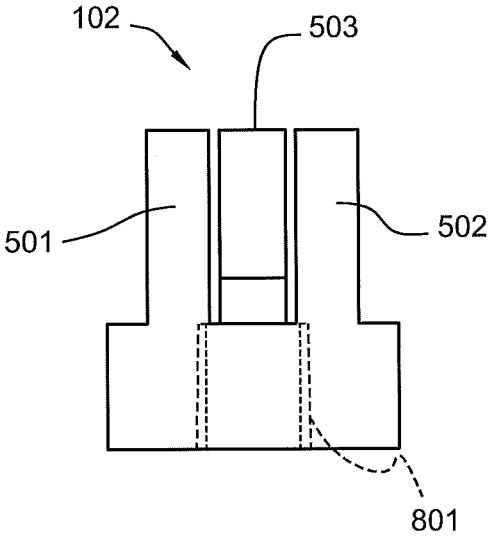
Fig.8C
(AMENDED)

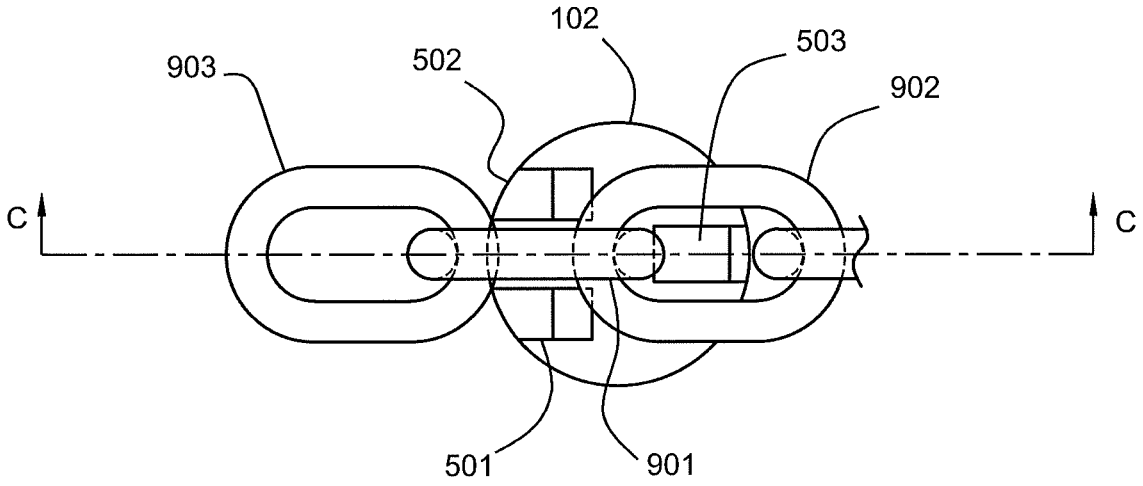
Fig.9A
(AMENDED)
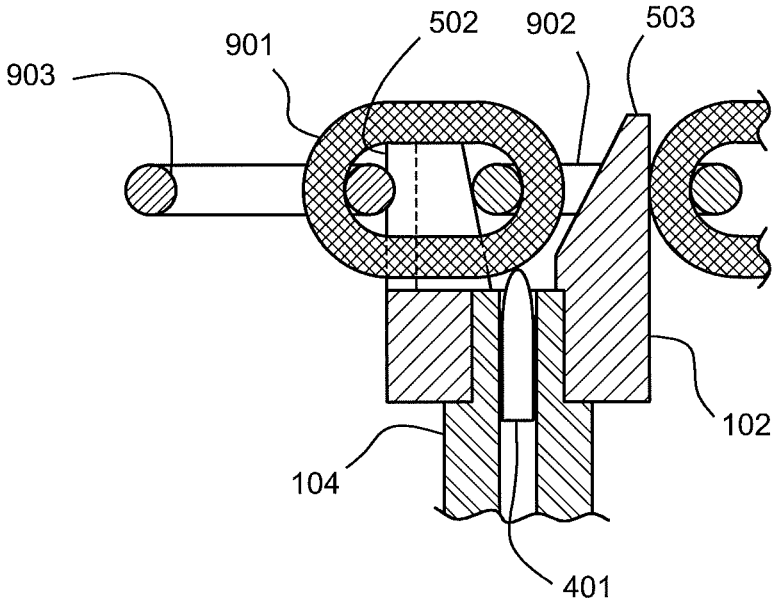
Fig.9B
(AMENDED)

BALLISTIC SYSTEM AND METHOD FOR CUTTING A MULTI-LINK METAL CHAIN

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

This disclosure relates to systems, methods, and devices that allow the ballistics of a projectile to cut a chain composed of multiple interconnected metal links.

There are situations in which one might be carrying a firearm and need to cut a metal chain. For example, the military or police might need to enter a facility that has been secured with a chain and lock. In these cases, it is advantageous if one can cut the chain without needing to bring along bolt cutters. Bolt cutters can be heavy and bulky, especially if a long lever arm is needed to cut a chain having links with a large cross sectional area.

A projectile, such as a bullet exiting the barrel of a firearm, has both kinetic energy (½ the mass multiplied by the square of velocity) and momentum (mass multiplied by velocity). This kinetic energy and/or momentum could be used to melt and deform a link in a metal chain. To cut the largest possible chain with the smallest possible projectile, both the location of impact on a link in the chain and the angle of incidence at this location must be controlled accurately and consistently. This is especially the case if the chain has links with a larger cross-sectional area than the cross-sectional area of the projectile being used to cut the chain. The system and method used to ballistically cut the chain should also be as small and light as possible, as well as being adaptable to attachment to as many different types of devices as possible. The system and method should interfere as little as possible with normal usage of the device, such as a firearm, prior to or after the use of the device to cut the chain.

SUMMARY OF THE INVENTION

In one embodiment, this disclosure presents a system and method for cutting a metal chain using a chain holder that is attachable to a firearm. The chain holder ensures that the stadium-shaped (or oval-shaped) target link of the metal chain is held in a specific location and orientation relative to the path of a bullet exiting the barrel of the firearm. The impact of the bullet can melt or soften a portion of the target link. The momentum of the bullet can cause the target link to open up, allowing the rest of the chain to fall away from the link that has been opened. The entire system or method can be used to cut a chain with a single bullet, even when the target link has a cross-sectional area larger than the cross-sectional area of the bullet. For example, an oval-shaped link made from 0.375 inch round cross section steel can be cut using a 0.223-inch diameter bullet from an AR15 rifle.

BRIEF DESCRIPTION OF THE DRAWINGS

The present disclosure is described in conjunction with the appended figures in which:

FIG. 5 shows a top view of the chain holder and chain in FIG. 1A;

FIG. 6 shows [and] *an* end view of the chain holder and chain in FIG. 1A;

FIG. 7 shows Section B-B of FIG. 6;

FIG. 8A, FIG. 8B, and FIG. 8C show three perpendicular views of the chain holder; and FIG. 9A, and FIG. 9B show the chain holder of the previous figures with a chain that is half the size of the chain in FIG. 5, FIG. 6, and FIG. 7.

It should be understood that the drawings are not necessarily to scale. In certain instances, details that are not necessary for an understanding of the invention or that render other details difficult to perceive may have been omitted. It should be understood that the invention is not necessarily limited to the particular embodiments illustrated herein.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It should be understood that various changes could be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, shapes and geometries may be shown generically and details may be left out in order not to obscure the embodiments in unnecessary detail.

Embodiments of the present invention are based on using the kinetic energy and/or the momentum of a projectile to sever and open a space in a target link of a metal chain. The kinetic energy of a projectile is given as $\frac{1}{2} mv^2$ where m is the mass and v is the velocity. The momentum of the projectile is given as [my] *mv* (mass times velocity). Both kinetic energy and momentum can be useful in severing and opening the space in the target link of a chain if the projectile can be accurately aimed at the right part of the target link. In an inelastic collision, some or all of the energy of a projectile is converted to heat, which can be used to soften, melt, or vaporize the material in a portion of the target link. The momentum can be used to open the softened part of the target link. Embodiments of the present invention can use kinetic energy and/or momentum from a projectile to open a gap in a target link of a chain so that the chain can be taken apart. Embodiments of the present invention can align and/or hold the target link in the chain accurately and securely enough to allow the kinetic energy and/or momentum of a projectile to do the job.

Figure 1A:
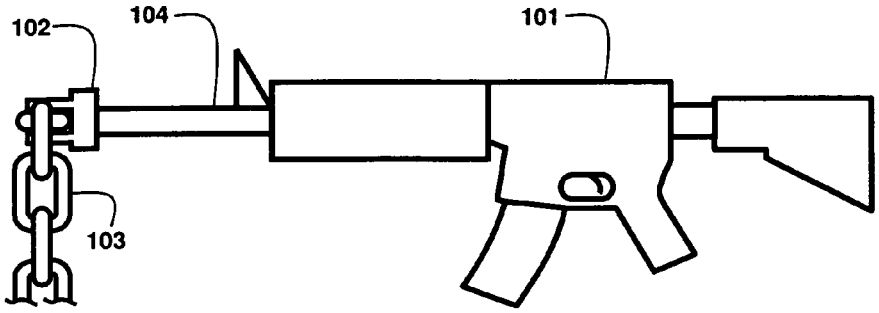
FIG. 1A shows a chain and chain holder attached to the barrel of a firearm.

FIG. 1A illustrates the general configuration employed by one embodiment of the present invention. Referring to FIG.

1A, a firearm is shown at 101. The firearm 101 can be any kind of a tubular weapon or similar device designed to discharge a projectile (such as a bullet). The firearm comprises a barrel, shown at 104. The firearm and the projectile can be any configuration or type capable of being understood by anyone skilled in the art, including pistols, rifles, etc. Some examples of types, sizes, and relevant characteristics of firearms and projectiles (bullets) are given in the table below:

| Gage & Type | Diameter of bullet inch/mm | Typical muzzle velocity (ft/sec)/ (m/sec) | Approximate bullet mass grains/grams | Approximate energy of bullet (Joules) |
|---|---|---|---|---|
| 22 rifle | 0.22 in<br>5.45 mm | 1080 ft/sec<br>330 m/sec | 40 grains<br>2.6 grams | 140 Joules |
| 223 rifle (AR15) | 0.223 in<br>5.56 mm | 2600 ft/sec<br>790 m/s | 55 grains<br>3.6 grams | 1100 Joules |
| 308 rifle | 0.308 in<br>7.62 mm | 2580 ft/sec<br>790 m/sec | 175 grains<br>11 grams | 3500 Joules |
| 38 caliber pistol (9 × 19 mm) | 0.38 in<br>9.00 mm | 1200 ft/sec<br>360 m/sec | 124 grains<br>8 grams | 540 Joules |
| 45 caliber pistol | 0.45 in/ | 830 ft/sec<br>250 m/sec | 230 grains<br>15 grams | 480 Joules |
| 50 caliber (BMG) | 0.50 in<br>12.7 mm | 3000 ft/sec<br>915 m/sec | 700 grains<br>45 grams | 19,000 Joules |

Figure 1B:
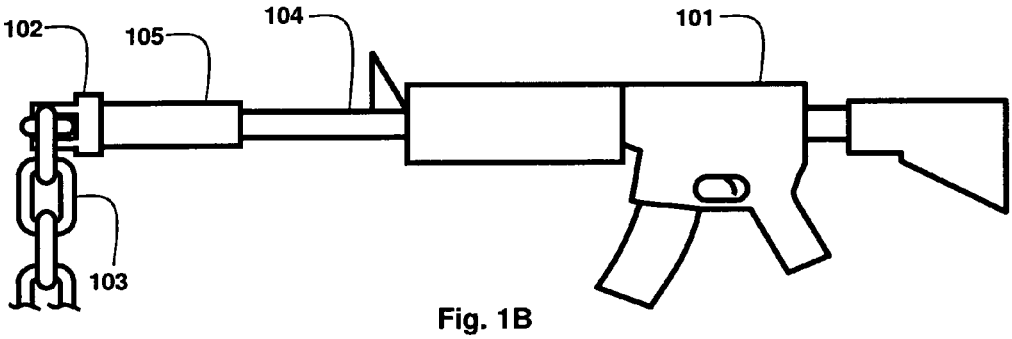
FIG. 1B shows a chain and chain holder attached to the silencer on a gun.

The firearm 101 of FIG. 1A has a chain holder, shown at 102, attached to the barrel 104. The chain holder 102 can be used to align a full sized chain, shown at 103. FIG. 1B, shows an embodiment of a firearm 101 with barrel 104 that further comprises a silencer, shown at 105. In the embodiment shown in FIG. 1B, the silencer 105 attaches to the barrel *104* and the chain holder 102 attaches to the silencer 105 to position the full sized chain 103.

Figure 2:
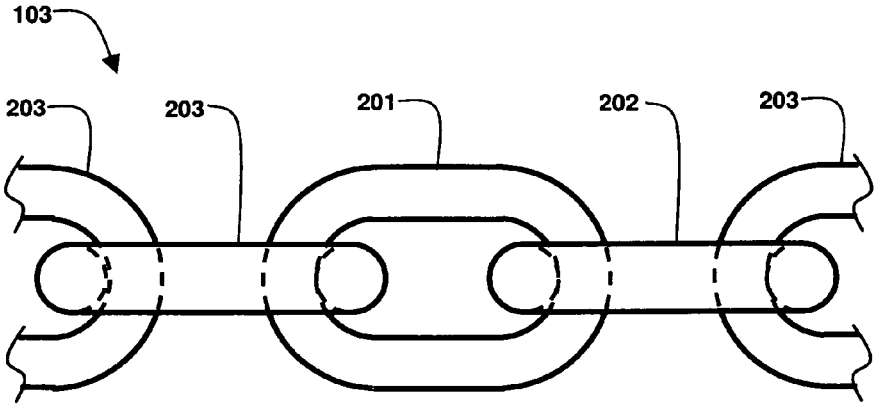
FIG. 2 shows a multi-link metal chain.

FIG. 2 provides more detail about the full sized chain 103 that was shown in FIG. 1A and FIG. 1B. The full sized chain 103 comprises a plurality of links, shown at 201, 202, and 203. Some specific links of interest are a target link, shown at 201, an adjacent link, shown at 202, and one or more other links, shown at 203. The target link 201 is the link that will be opened up using the ballistics from a projectile. In one embodiment, both the target link 201, and the adjacent link 202 are used by the chain holder (102 in FIG. 1A and FIG. 1B) to correctly hold and orient the target link [102] *201* so that it can be opened using the ballistics from a bullet, as [will] described later in this disclosure. The other links are illustrated as part of the chain *103* to demonstrate that a chain normally consists of many links. In many cases, all links [101, 102, and 103] *201, 202, 203* share the same geometry and are fabricated from metal rod that is then welded together once the links have been interconnected. The links can be made of any material capable of being understood by anyone skilled in the art and each link can be formed and bonded together using any technique capable of being understood by anyone skilled in the art. Steel is one example of a material used to fabricate the links.

Figure 3A:
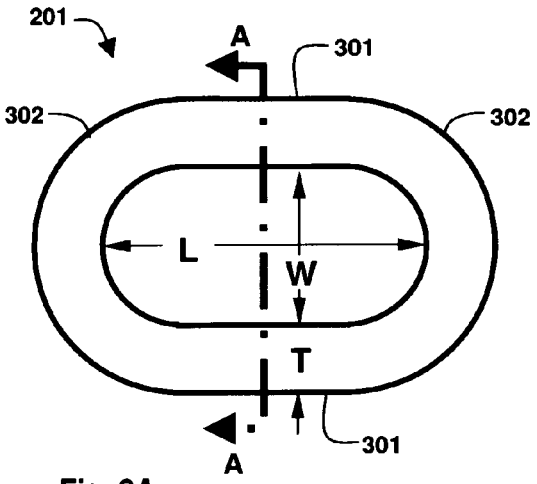
FIG. 3A shows the details of one link of a chain.
Figure 3B:
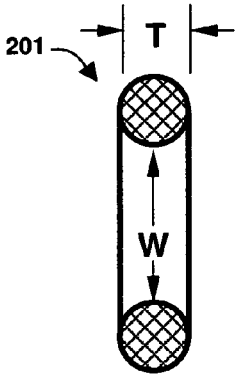
FIG. 3B shows a view of section A-A of FIG. 3A.

FIG. 3A shows a projection of the target link in its stadium orientation at 201. This target link 201 was previously shown as part of a multi-link chain in FIG. 2. FIG. 3B shows section A-A of FIG. 3A. The target link 201 has the same shape as the other links in a typical chain, a shape that can be described geometrically as a stadium shape. A stadium shape can also be called a discorectangle and can further be defined as a rectangle (or pair of straight line segments) with a pair of semicircles at opposite ends. The target link, 201 in FIG. 3A, comprises two straight sections 301, opposite each other, connected to two semi-circular sections 302 opposite each other. This is the same shape as for other links of a typical multi-link chain. FIG. 3B shows that the target link 201 has a circular cross-section, which is typically also the same for all other links of a multi-link chain. This circular cross-section is somewhat consistent for all cross sections anywhere in every link of a multi-link chain, including all straight sections 301 and all semi-circular sections 302. Target links 201, and all other links of a typical multi-link chain, are [is] substantially symmetric about a central stadium plane that bisects the center of the [chain] *link* to create a stadium-shaped cross section. The links of a multi-link chain are typically also symmetric about the two planes that are orthogonal to this main or "stadium plane" of the links and go through the geometric center of the links. Referring to FIG. 3A, links of a chain are typically dimensioned based on width of the opening W, length of the opening L, and thickness of the links T, wherein T can also be described as the diameter of the cross section of the target link 201, or any other link of the chain. Referring to FIG. 2, it should also be noted that alternate links of a chain have a central stadium plane that is rotated 90 degrees from their neighbors. These links are interconnected through the central open regions of each stadium-shaped ring. The following tables provide typical standard chain dimensions for links in English and metric units:

| T (inches) | L (inches) | W (inches) |
|---|---|---|
| 3/16 (0.187) | 0.95 | 0.40 |
| 1/4 (0.250) | 1.00 | 0.50 |
| 5/16 (0.312) | 1.10 | 0.50 |
| 3/8 (0.375) | 1.23 | 0.62 |
| 1/2 (0.500) | 1.50 | 0.81 |
| 5/8 (0.625) | 1.87 | 1.00 |
| 3/4 (0.750) | 2.12 | 1.12 |
| 7/8 (0.875) | 2.50 | 1.37 |
| **T (mm)** | **L (mm)** | **W (mm)** |
| 5.5 | 24 | 7.7 |
| 7.0 | 31 | 9.8 |
| 8.0 | 32 | 11.2 |
| 10.0 | 34 | 14 |
| 13.0 | 45 | 18 |
| 16.0 | 55 | 20 |
| 20.0 | 69 | 25 |

Using the dimensions above, the density of steel (8 grams per cubic centimeter), and the energy required to melt steel (about 30 Joules/gram), one can determine if a bullet has the kinetic energy to melt enough steel in the link to cut the chain. Extensive testing showed that about 10% of the ballistic energy from an optimally aimed bullet is available for melting the steel. The remaining energy melts the bullet and is lost in other ways. Thus, one needs about 10× the calculated energy. Below is a summary of the ballistic energy needed to cut typical chains assuming that a volume of the chain equivalent to the cross sectional area of the link multiplied by the thickness of the link must be melted to create a gap in the target link.

| T (inches) | Energy to melt steel | 10× energy to melt |
|---|---|---|
| 3/16 (0.19) | 20 Joules | 200 Joules |
| 1/4 (0.25) | 48 Joules | 480 Joules |
| 5/16 (0.31) | 94 Joules | 940 Joules |

-continued

| T (inches) | Energy to melt steel | 10× energy to melt |
|---|---|---|
| 3/8 (0.38) | 160 Joules | 1,600 Joules |
| 1/2 (0.50) | 390 Joules | 3,900 Joules |
| 5/8 (0.62) | 750 Joules | 7,500 Joules |
| 3/4 (0.75) | 1,300 Joules | 13,000 Joules |
| 7/8 (0.88) | 2,100 Joules | 21,000 Joules |

Using the above information and the ballistic energy that was calculated for various gages and types of bullets, the following table shows which firearms can cut what sizes of chains if the bullet is accurately aimed at an optimal location on a target link of the chain. Note that it is desirable to cut the chain even when the energy available has been labeled as "Marginal", by ensuring that the bullets are aimed accurately and consistently at the optimal location and in the optimal orientation to the target link.

| Link | Does this firearm have enough energy to cut this chain? | | | | | |
|---|---|---|---|---|---|---|
| Thickness T (inches) | 22 Rifle (140 J) | 45 Pistol (480 J) | 38 Pistol (540 J) | AR 15 (1,100 J) | 308 Rifle (3,500 J) | BMG (19,000 J) |
| 3/16 | Marginal | Yes | Yes | Yes | Yes | Yes |
| 1/4 | No | Marginal | Marginal | Yes | Yes | Yes |
| 5/16 | No | No | No | Marginal | Yes | Yes |
| 3/8 | No | No | No | Marginal | Yes | Yes |
| 1/2 | No | No | No | No | Marginal | Yes |
| 5/8 | No | No | No | No | No | Yes |
| 3/4 | No | No | No | No | No | Yes |
| 7/8 | No | No | No | No | No | Marginal |

Figure 4A:
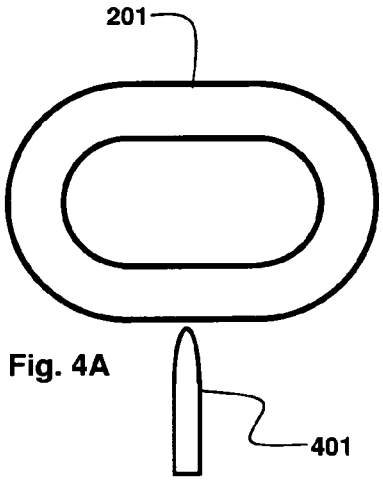
FIGS. 4A, 4B, 4C, 4D, 4E, and 4F show locations at which a bullet could be fired into a chain and the resulting ballistic impacts.
Figure 4B:
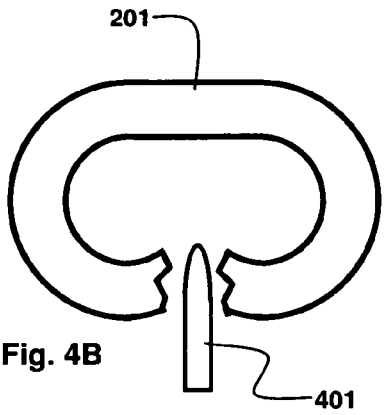
Figure 4C:
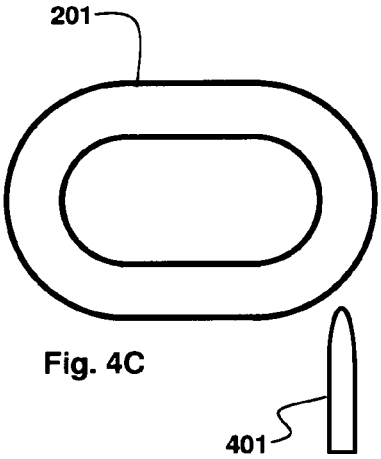
Figure 4D:
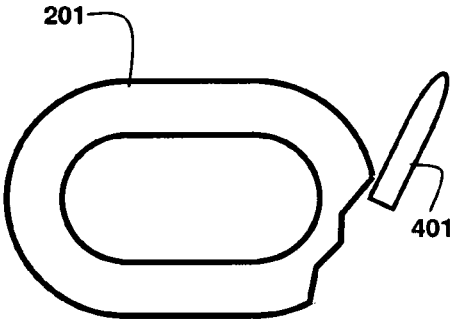
Figure 4E:
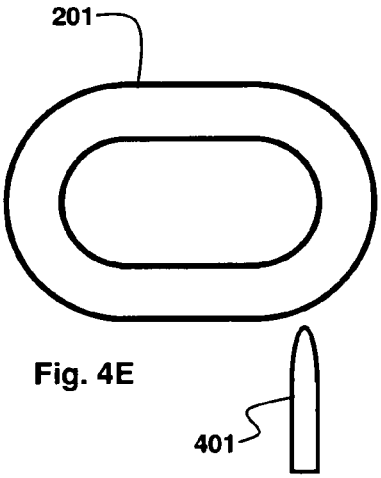
Figure 4F:
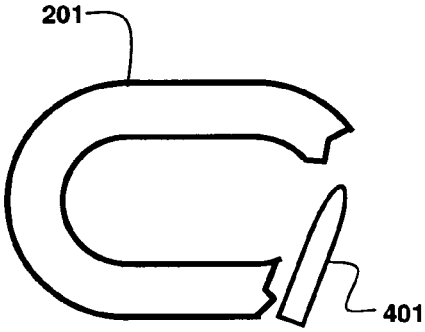

Having described the physics involved in ballistic heating and deformation of the link of a chain, the next step is to identify the optimal location and direction of impact for a bullet onto a stadium-shaped link of a chain. First it should be noted that the bullet should be fired in a direction that is coplanar with the central stadium plane of the target link so that the bullet hits the target link at the center of the circular cross-section of the stadium-shaped ring. Having defined one of the dimensions, FIG. 4A, FIG. 4B, FIG. 4C, FIG. 4D, FIG. 4E, and FIG. 4F illustrate the location and angle of incidence in the other two dimensions that is required for a bullet 401 to open a gap in the target link 201 of a chain so that the opening is sufficiently large to allow the chain to be disassembled. If the bullet 401 is fired at the center of the straight section of the target link 201, as shown in FIG. 4A and the bullet has enough kinetic energy to melt an opening in the target link 201, the momentum of the bullet 401 causes the target link 201 to close in on itself, preventing the other links of the chain from being removed from the target link, a configuration shown in FIG. 4B. Note that a bullet with "marginal" energy does not have the capability of also severing the second straight section of the target link 201. If the bullet 401 is fired at the semicircular end of the target link 201 at an angle that is too far from perpendicular to that point, as shown in FIG. 4C, the high incidence angle will cause the bullet 401 to ricochet off the semicircular segment of the target link 201, without opening a gap in the target link, a result shown in FIG. 4D. As illustrated by FIG. 4E and FIG. 4F, the objective is to have the bullet 401 impact the target link 201 in a target region defined as being on a semicircular segment at a position near the junction of the semicircular segment and a straight segment. The ideal angle of incidence of the bullet at the target region is between perpendicular (which can cause the link to close in on itself) and too far from perpendicular (which can cause the bullet to ricochet without severing the link). More specifically, when the bullet 401 impacts a region of the semicircular end of the target link 201 at an angle slightly outboard from perpendicular and not too far outboard from perpendicular, the kinetic energy of the bullet 401 will optimally melt enough of the end of the target link 201 and the momentum of the bullet 401 will open up the target link so that the gap in the target link is as large as possible based on the ballistic energy available from the bullet 401. By "outboard from perpendicular" in the context of this disclosure we mean an angle of incidence that would cause the bullet 401 to veer away from the center of the link. The angle of incidence can be measured as an angle of a line relative to the line that is perpendicular to the line tangent to the arc of the semicircular region at the point of impact. The angle of incidence should be in one of the following ranges to optimize the efficient use of both kinetic energy and momentum, and the optimal angle can vary depending upon the bullet material, size, and velocity:

a. Between perpendicular and 45 degrees outboard of perpendicular;
b. Between perpendicular and 30 degrees outboard of perpendicular;
c. Between 5 degrees outboard of perpendicular and 45 degrees outboard of perpendicular;
d. Between 5 degrees outboard of perpendicular and 30 degrees outboard of perpendicular;
e. Between 10 degrees outboard of perpendicular and 45 degrees outboard of perpendicular; and
f. Between 10 degrees outboard of perpendicular and 45 degrees outboard of perpendicular.

FIG. 5 provides a more detailed top view of the full sized chain 103 and chain holder 102 that were shown in FIG. 1A and FIG. 1B. More specifically, the chain holder in this embodiment is the same as what was shown in FIG. 1A in that the chain holder 102 is mounted directly on the barrel 104. In FIG. 5, the full sized chain 103 comprises multiple links including a target link, shown at 201 and an adjacent link, shown at 202. The chain holder 102 comprises an adjacent link pin, shown at 503, that goes through the center of the adjacent link. The chain holder further comprises a first target link pin, shown at 501. The first target link pin 501 is located on one side of the target link 201.

FIG. 6 provides an end view of the embodiment of the chain and chain holder that were shown in FIG. 5. FIG. 7 provides a section view of Section [A-A] *B-B* in FIG. 6. Referring to FIG. 6 and FIG. 7, the chain holder is shown at 102, the full size chain is shown at 103, the target link is shown at 201, and the adjacent link is shown at 202. FIG. 6 shows that the first target link pin 501 and the second target link pin 502 are located on the two opposite sides of the target link 201 and that the adjacent link pin 503 goes through the adjacent link *202*. This triangular configuration of the two target link pins 501 and 502 and the adjacent link pin 503 is what holds the target link 201 in the correct position and orientation relative to the end of the barrel. The specific location of the target link 201 can best be seen in the FIG. 7, which shows that a bullet 401 exiting the barrel 104 would hit the target link *201* at a curved (semicircular) end of the target link *201* at an angle of incidence that is outboard from perpendicular at the point of impact.

FIG. 8A, FIG. 8B, and FIG. 8C provide a detailed view of one embodiment of a chain holder, at 102. In particular, these three figures provide three orthogonal views that show the relative location and size of the first target link pin 501, the second target link pin 502, and the adjacent link pin 503. The chain holder 102 can be made of any material using any manufacturing process capable of being understood by anyone skilled in the art. In one embodiment, the chain holder 102 is made of machined 6061 aluminum. In one embodiment, the chain holder 102 has a threaded connection, shown at 801, for threading onto the barrel of a firearm. The chain holder 102 could also have another type of connection capable of being understood by anyone skilled in the art. The connection can be a detachable connection. The connection can be a permanent connection. The chain holder 102 could also be attached to a silencer (shown as 105 in FIG. 1B) that is then attached to the barrel of a firearm wherein the connection between the chain holder 102 and silencer (105 in FIG. 1B) could be any type of connection capable of being understood by anyone skilled in the art.

FIG. 9A and FIG. 9B show that the configuration of the first target link pin 501, the second target link pin 502, and the adjacent link pin 503 on the chain holder 102 have angled surfaces that allow the chain holder 102 to work with different sizes of chains. In particular, FIGS. 9A and 9B illustrate the use of the same chain holder 102 that was shown in FIG. 5 and FIG. 6 with a metal chain that is half the size relative to what was shown as the full size chain in FIG. 5 and FIG. 6. More specifically, these two figures show that a half size target link 901 can be held in position by the first target link pin 501 and the second target link pin 502, especially when additional guidance is provided by these pins to a half size other link 903 that is shown at 903. The adjacent link pin 503 has been sized so that it can fit inside of the adjacent link 902. Thus, a bullet 401 fired from a barrel 104, would hit the half size target link 901 in the proper location and orientation to open the half size target link sufficiently to cut a chain that is half the size of the chain shown on the chain holder 102 in FIG. 5 and FIG. 6. By having a chain holder 102 that can handle such a broad range of sizes, it becomes possible to cut most chains [any] *and* only carry one chain holder 102.

With reference to the previous figures that show the chain holder 102, another benefit of the chain holder design should be pointed out. The firearm can be used as a normal firearm with the chain holder 102 attached at all times. The chain holder provides no obstruction to any projectiles that might be fired.

A number of variations and modifications of the disclosed embodiments can also be used. The principles described here can also be used for in applications other than chain cutting. While the principles of the disclosure have been described above in connection with specific apparatuses and methods, it is to be clearly understood that this description is made only by way of example and not as limitation on the scope of the disclosure.

We claim:

1. A system for ballistically opening a target link of a multi-link metal chain, the system comprising:

a firearm attachment feature wherein:

the firearm attachment feature [detachably] attaches to a firearm to align the system with the path of a bullet exiting a barrel of the firearm *along a barrel axis defined by the center of the barrel*; and a chain alignment module comprising:

a first target link pin configured to sit on one side of the target link;

a second target link pin configured to sit on the other side of the target link;

a first adjacent link engagement feature located on a side of the first target link pin [facing] *nearest* the barrel *axis* and a second adjacent link engagement feature located on a side of the second target link pin [facing] *nearest* the barrel *axis* wherein:

the first adjacent link engagement feature comprises a first [adjacent link engagement] flat region;

the second adjacent link engagement feature comprises a second [adjacent link engagement] flat region;

the first flat region is coplanar with the second flat region; and the first flat region and the second flat region are configured for engaging with an adjacent link wherein the adjacent link is a link on the multi-link metal chain located adjacent to the target link and rotated 90 degrees from the target link;

a slot between the first target link pin and the second target link pin wherein:

the slot comprises a first [target link] sidewall located on a side of the first target link pin and a second [target link] sidewall located on a side of the second target link pin;

the first sidewall comprises a first flat surface;

the second sidewall comprises a second flat surface;

the first flat surface is parallel to the second flat surface;

[the midplane defined by the] *a* plane midway between the first flat surface and the second flat surface is coplanar with [a barrel axis defined by the center of the barrel] *the barrel axis*; and the slot is configured for placement of the target link between the first flat surface and the second flat surface; and an adjacent link pin configured to go through a central open region of the adjacent link, wherein:

the adjacent link pin comprises a target link engagement surface located on a side of the adjacent link pin [facing an end of the barrel] *nearest the barrel axis*, wherein the target link engagement surface is configured as a stop for a semicircular end of the target link;

the adjacent link pin further comprises a first adjacent link pin side and a second adjacent link pin side;

the first adjacent link pin side and the second adjacent link pin side are on opposite sides of the adjacent link pin;

the first adjacent link pin side is parallel to the second adjacent link pin side;

the first adjacent link pin side and the second adjacent link pin side are parallel to the first flat surface and the second flat surface; and the first adjacent link pin side and the second adjacent link pin side are configured for passing through the central open region;

whereby the first target link pin, the second target link pin, and the adjacent link pin are shaped and positioned relative to the firearm attachment feature so the path of the bullet impacts a central plane of the semicircular end of the target link.

2. The system of claim 1 wherein:

the system is configured to attach to a barrel of a firearm that uses a 0.223-inch diameter bullet; and the system further comprises the multi-link chain, wherein:

the target link and the adjacent link comprise a maximum cross-sectional diameter of 0.375 inches; and the target link and the adjacent link comprise a minimum cross-sectional diameter of 0.188 inches.

3. The system of claim 1 wherein the system attaches to a silencer that attaches to the barrel of the firearm.

4. The system of claim 1 wherein the system attaches directly to the barrel of the firearm and the firearm attachment feature comprises a threaded connection.

5. A system for ballistically cutting a multi-link metal chain, the system comprising:

a firearm attachment feature wherein:

the firearm attachment feature [detachably] attaches to the barrel of a firearm to align the system with the path of a bullet exiting the firearm; and a chain alignment module comprising a first pin, a second pin, and a third pin, wherein:

[the] *a* gap between the first pin and the second pin facilitates alignment of a target link of the metal chain, wherein:

the gap [comprises] *is at least partially defined by* a first surface located on the first pin and a second surface located on the second pin; and

[the] *a* mid-plane [of] *between* the first surface and the second surface is coplanar with the path of the bullet;

the third pin fits through the center of a link adjacent to the target link;

the third pin comprises a target link engagement surface for positioning a semicircular region of the target link with the path of the bullet;

the first pin comprises a first feature for engaging the link adjacent to the target link;

the second pin comprises a second feature for engaging the link adjacent to the target link; and the first feature and the second feature are parallel.

6. The system of claim 5 wherein:

the system is configured to attach to a barrel of a firearm that uses a 0.223-inch diameter bullet; and the system further comprises the multi-link chain, wherein:

the target link and the adjacent link comprise a maximum cross-sectional diameter of 0.375 inches; and the target link and the adjacent link comprise a minimum cross-sectional diameter of 0.188 inches.

7. The system of claim 5 wherein the system attaches to a silencer that attaches to the barrel of the firearm.

8. The system of claim 5 wherein the system attaches directly to the barrel of the firearm and the firearm attachment feature comprises a threaded connection.

9. The system of claim 5 wherein the chain alignment module is configured to fit the target link of a chain that has a cross sectional diameter greater than or equal to a value selected from the group of 0.187 inches, 0.250 inches, and 0.375 inches.

10. The system of claim 5 wherein the chain alignment module is configured to fit the target link of a chain that has a cross sectional diameter less than or equal to a value selected from the group of 0.187 inches, 0.250 inches, and 0.375 inches.

11. The system of claim 5 wherein the chain alignment module is configured to align and fit all multi-link chains that have a stadium-shaped target link further comprising:

a circular cross section with a diameter in the range of 0.187 inches to 0.375 inches;

an inside length ranging from 0.95 inches to 1.23 inches; and an inside width ranging from 0.4 inches to 0.62 inches; and a stadium-shaped adjacent link connected to the target link and rotated 90 degrees from the target link comprising:

a circular cross sectional with a diameter in the range of 0.187 and 0.375 inches;

an inside length ranging from 0.95 inches to 1.23 inches; and an inside width ranging from 0.4 inches to 0.62 inches.

12. The system of claim 5 wherein the firearm uses a 0.223-inch bullet.

13. The system of claim 5 wherein:

the firearm uses a 0.308-inch bullet; and the system further comprises the multi-link chain, wherein:

the target link and the adjacent link comprise a maximum cross-sectional diameter of 0.5 inches; and the target link and the adjacent link comprise a minimum cross-sectional diameter of 0.25 inches.

14. The system of claim 5 wherein the path of the bullet impacts the target link in the semicircular region of the target link at an angle of incidence that further causes an opening of the target link to be large enough that the adjacent link can be detached from the target link.

15. The system of claim 5 wherein:

the first pin, the second pin, and the third pin are in a triangular configuration;

the first feature comprises a first flat region;

the second feature comprises a second flat region;

the first region is coplanar with the second region;

the first surface is parallel to the second surface;

the third pin comprises a first adjacent link pin side and a second adjacent link pin side;

the first adjacent link pin side is parallel to the second adjacent link pin side; and the first adjacent link pin side and the second adjacent link pin side are parallel to the first surface and the second surface.

16. The system of claim 5 wherein the first pin, the second pin, and the third pin are shaped and positioned relative to the firearm attachment feature so the path of the bullet impacts the target link in the semicircular region of the target link at an angle of incidence that is outboard from perpendicular at the point of impact.

17. The system of claim 5 wherein:

the first pin, the second pin, and the third pin have angled surfaces; and the target link engagement surface is a flat angled surface located on the side of the third pin facing the path of the bullet.

18. A method for ballistic cutting of a multi-link metal chain, the method comprising the steps of:

establishing a fixture comprising three rigid pins;

aligning the fixture with the path of a bullet exiting a firearm proximate to the point where the bullet exits the barrel of the firearm;

placing a target link of the multi-link metal chain between [a first pin and a second pin] *two of the three rigid pins*;

placing a second link over [a third pin] *the third of the three rigid pins*, wherein the second link [comprises a link] *is* adjacent to the target link; and wherein placing the target link and placing the second link further comprise placing the target link in a location so that the path of the bullet impacts the target link in a semicircular region of the target link at an angle of incidence that causes the target link to open.

19. The method of claim 18 wherein:

the method is used to cut a steel multi-link metal chain; and the chain comprises a plurality of stadium-shaped interconnected steel links that are oriented at 90 degree angles from each other.

20. The method of claim 18 wherein the method further comprises the step of removing the target link from the second link.

*21. The system of claim 1 wherein the firearm attachment feature detachably attaches to the firearm.*

*22. The system of claim 1 wherein the firearm attachment feature permanently attaches to the firearm.*

*23. The system of claim 5 wherein the firearm attachment feature detachably attaches to the firearm.*

*24. The system of claim 5 wherein the firearm attachment feature permanently attaches to the firearm.*

*25. A chain holder for ballistically opening a target link of a multi-link chain, said chain holder being attachable to a firearm having a barrel and comprising:*

*a first target link pin having a first side with a first flat region for engaging a link connected to the target link and a second side with a first flat surface at least partially defining a slot;*

*a second target link pin having a first side with a second flat region for engaging a link connected to the target link and a second side with a second flat surface at least partially defining the slot, said second flat region being coplanar with the first flat region, and said second flat surface being parallel with the first flat surface;*

*a midplane halfway between the first flat surface and the second flat surface, said midplane being coplanar with a barrel axis defined by the center of the barrel when the chain holder is attached to the firearm;*

*an adjacent link pin with a target link engagement surface facing the barrel axis when the chain holder is attached to the firearm, a first adjacent link pin side and a second adjacent link pin side opposite the first adjacent link pin side, said first adjacent link pin side and a said second adjacent link pin side being parallel to the midplane; and*

*wherein the target link has a semicircular end with a central plane in the barrel axis when the chain holder is attached to the firearm and the target link is inserted into the slot.*

*26. A chain holder for ballistically opening a target link of a multi-link chain, said chain holder being attachable to a firearm having a barrel and comprising:*

*a first side attachable to a firearm;*

*a second side opposite the first side;*

*an aperture extending between the first side and the second side, said aperture being axially aligned with a barrel axis defined by the center of the barrel when the chain holder is attached to the firearm;*

*a first pin extending from the second side, said first pin having a first sidewall with a first flat surface;*

*a second pin extending from the second side, said second pin having a second sidewall with a second flat surface substantially parallel to the first flat surface;*

*a gap between the first pin and the second pin, said gap being configured to receive the target link and having a midplane parallel to the first and second flat surfaces, said midplane being coplanar with the barrel axis when the chain holder is attached to the firearm;*

*a third pin extending from the second side, said third pin having a target link engagement surface facing the barrel axis when the chain holder is attached to the firearm, and said third pin being configured to at least partially fit through a central open region of a link adjacent to the target link; and*

*wherein the first pin comprises a first feature for engaging the link adjacent to the target link, the second pin comprises a second feature for engaging the link adjacent to the target link, and the first feature and the second feature are coplanar.*

*27. The chain holder claim 26 wherein the first side detachably attaches to the firearm.*

*28. The chain holder of claim 26 wherein the first side permanently attaches to the firearm.*

* * * * *